United States Patent [19]

Moreland et al.

[11] 4,442,544
[45] Apr. 10, 1984

[54] ADAPTIVE THRESHOLDER

[75] Inventors: John F. Moreland, Fairport; James C. Stoffel, Rochester, both of N.Y.

[73] Assignee: Xerox Corporation, Stamford, Conn.

[21] Appl. No.: 281,816

[22] Filed: Jul. 9, 1981

[51] Int. Cl.³ .............................................. G06K 9/00
[52] U.S. Cl. ..................................................... 382/53
[58] Field of Search .............. 382/53, 68; 250/203 R, 250/209; 328/68, 78, 146, 151

[56] References Cited

U.S. PATENT DOCUMENTS

| 3,502,993 | 3/1970 | Schorzinger et al. | 382/52 |
| 3,509,533 | 4/1970 | Bieser et al. | 382/48 |
| 3,599,151 | 8/1971 | Harr | 382/53 |
| 3,833,883 | 9/1974 | Haupt et al. | 382/53 |
| 3,852,714 | 12/1974 | Carson | 250/209 X |
| 4,051,536 | 9/1977 | Roetling | 358/298 |
| 4,132,977 | 1/1979 | Nagano | 382/53 |
| 4,159,432 | 6/1979 | Burke et al. | 382/53 X |
| 4,234,867 | 11/1980 | Butin | 382/53 |
| 4,259,662 | 3/1981 | Yoshida | 382/53 |

OTHER PUBLICATIONS

Dynamic Video Thresholding, H. Klepp, IBM Technical Disclosure Bulletin, vol. 22, No. 3, Aug. 1979, pp. 1031–1033.

Primary Examiner—Edward J. Wise
Attorney, Agent, or Firm—Frederick E. McMullen

[57] ABSTRACT

An adaptive thresholder for processing image pixels. A portion of the image pixel line or lines is examined and the maximum and minimum pixels in the line portion determined. The maximum and minimum pixels are differenced, and the resulting difference signal compared to a constant representing the minimum desired change in background level. Where the difference signal is larger, a new threshold is thereafter used.

To determine the new threshold level, the difference signal is multiplied by a factor representing the amount of change in threshold for a given event and the result subtracted from the previously determined maximum pixel. The subtracted output is brought within predetermined maximum and minimum threshold constraints to provide the new threshold.

5 Claims, 4 Drawing Figures

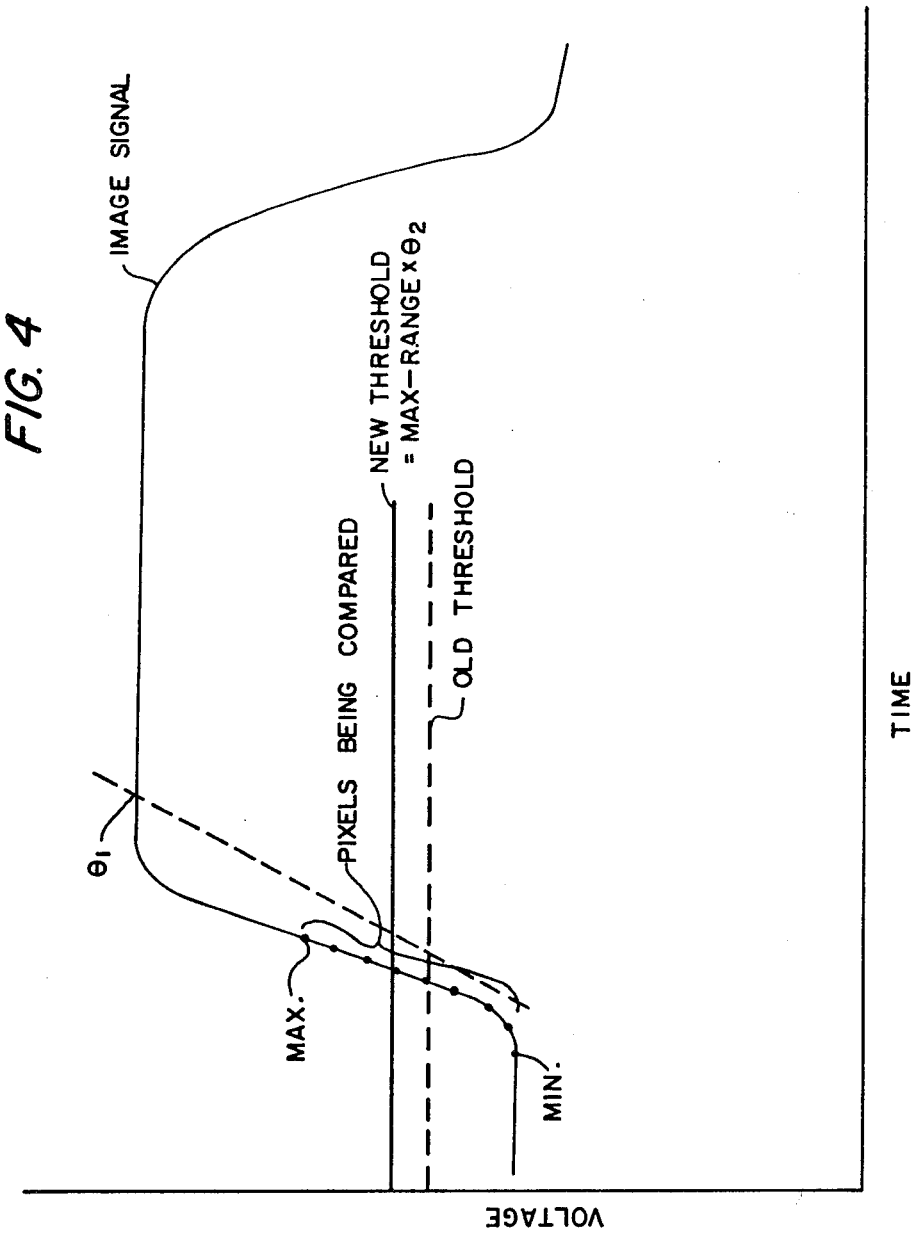

ADAPTIVE THRESHOLDER

This invention relates to a method and apparatus for thresholding image pixels, and more particularly to an improved method and apparatus for adaptively thresholding image pixels in response to changes in image content.

In image reading systems employing for example a raster scanner having one or more linear arrays of Charge Coupled Devices (commonly referred to as CCD's) for scanning document originals, the varying background densities of different pages and the different subimage areas of the same page, especially magazines with color, can present problems. In addition, the density of the printing inks and, hence the line copy and halftones produced can also vary. As a result, it is not always possible to select a single density level at which to threshold the raster scanner output which is ideal for all paper and ink conditions. This problem normally confronts all binary output scanners.

Various techniques have been suggested to overcome or at least alleviate the problem such as sensing the edge of the document original and adjusting background level in response to the background signal obtained, or setting threshold levels as a percentage of signal peaks detected or by the signal level of certain ones or combinations of neighboring image areas, etc.

Where for example the document original comprises line copy, i.e. a typed sheet, variations in input line density may require variations in threshold. Otherwise, image portions may be missed as for example where the line density is below the existing threshold level. In that case, the line image is consigned to background and therefore lost. Similarly, variations in background density may require variations in thresholds. Otherwise, areas that should be identified are instead identified as image areas. Typically this occurs when the background area rises above the threshold level as may occur when the document original or a portion thereof has a colored background. Combinations of the aforementioned, i.e. variations in line density and in background density, also demonstrate the need for adjusting threshold levels in accordance with the image content of the document original. Where the document original is a halftone, threshold variation is helpful when one is seeking to reproduce the halftone without rescreening. There variations in printing density and background will result in grayscale translations of the type discussed if the density of the halftone dots produced by the image producer such as a xerographic machine is different from that of the input.

In considering macro vs. micro adaptive thresholding, macro adaptive thresholding, which is a once per page correction for the environment, corrects for background variations and line density variations. However, if the input image has various densities of lines for example, an optimal single level threshold may not be sufficient as noted earlier. Furthermore, the simultaneous enhancement of detectability for small "white" and "black" detail is not enabled by a one-per-page, macro adaptive, threshold. In micro adaptive thresholding, the conversion from multivalued to binary valued picture elements or pixels is a function of regional properties of the image. Microadaptation may correct for line density and background as well as facilitate enhanced detection of MTF degraded detail imagery. Furthermore, images with regions of various densities of lines may be reproduced with regionally independent thresholds. However, micro adaptive thresholding logic is in general a more complex function than the simple threshold function. Simple thresholding is a point process while micro adaptive thresholding is a function of the neighborhood around the pixel being converted to a binary level.

One and two pass processing may also be thought of where a prescan of an image is the first step in a macro adaptive strategy. One may then use a pixel graylevel histogram to select the threshold for the entire page. This results in a two pass scan of the image or a grayscale buffering of the entire image. Either method is relatively expensive. Furthermore, average statistics such as from a graylevel histogram may be very misleading to threshold selection logic. A one pass macro adaptive threshold function relies in general on the image margins and perhaps on the first "black" information to set the threshold value for the remainder of the page. Micro adaptive threshold logic may utilize large contexts to define the binary output value of a single pixel. Although it is possible to develop a two pass micro adaptive algorithm, in general only one pass is required. The expense is incurred by the need to buffer and manipulate the context around the pixel to be converted to a binary value.

The present invention relates to a method of determining the optimum threshold for thresholding image pixels, comprising the steps of buffering a block of image pixels in a stream of image pixels, at least one of the pixels in the block of pixels comprising the pixel to be thresholded; identifying maximum and minimum pixels in the block of pixels; differencing the maximum and minimum pixels from one another to provide a difference signal; multiplying the difference signal by a predetermined constant representing a desired change in threshold level to provide a base threshold; and differencing the base threshold from the maximum pixel to provide the optimum threshold.

The invention further relates to an apparatus for adaptively thresholding image pixels, comprising in combination: buffer means for storing a plurality of successive ones of the pixels including the pixel to be thresholded; means for identifying the maximum pixel in the plurality of pixels; means for identifying the minimum pixel in the plurality of pixels; first subtractor means for subtracting the output of the maximum pixel identifying means from said minimum pixel identifying means; multiplier means for multiplying the output of the first subtractor means by a predetermined constant representing a desired change in threshold level; and second subtractor means for subtracting the output of the multiplier means from the maximum pixel identifying means to provide a threshold for use in thresholding the one pixel.

In the drawings:

FIG. 4 is a graph showing the adaptive threshold maximum and minimum relationships.

As used herein, the term pixel refers to a picture element which essentially comprises a signal, the voltage level of which is representative of image graylevel. By way of example, a voltage level of zero may be considered as representing black while a voltage level of 255 millivolts (m.v.) may be considered as representing white. Voltage levels between zero and 255 m.v. represent different shades of gray from the darkest gray at 1 millivolt and progressing upwardly to the lightest gray at 254 millivolts.

The image pixels may be derived from any suitable source as for example a raster input scanner of the type employing one or more linear arrays, for example CCD's, arranged to scan the image on a document original line by line. For this purpose, relative movement as by means of a document transport is established between the original being scanned and the array or arrays. The image pixels produced by the array or arrays, which due to the inherent operating characteristics of arrays of this type are in bursts of one line each, are typically processed by thresholding or screening. For thresholding, the image pixels are compared, i.e. thresholded against a preset signal or threshold level which effectively converts the analog pixel signals output by the array or arrays to binary level pixel signals. In the example given above, a threshold of 128 millivolts may be envisioned. With the use of a comparator circuit, pixels below 128 millivolts are classified as black image areas while pixels equal to or above 128 millivolts are classified as white or background image areas. Screening is similar except that multiple ones of the image pixels are compared or thresholded against a corresponding number of selected threshold levels.

Figure 1:
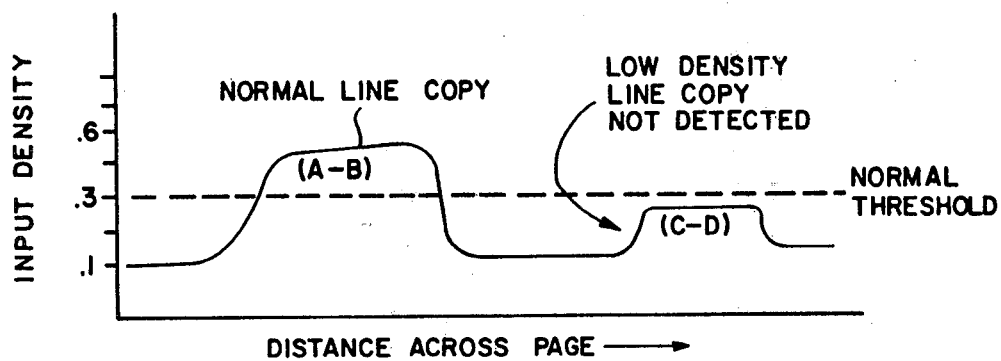
FIG. 1 is a graph plot illustrating typical image line copy profiles.

Referring now to FIG. 1 of the drawings, there is shown a plot of a typical image line, identified by the numeral 10, as derived from an original having a line copy image, i.e. a typed page. As seen there, the normal image line A-B rises above the nominal threshold level and hence is identified by the thresholder as image data. Areas below the threshold level are of course identified as non-image or background areas. However, abnormal image lines such as low density lines shown at C-D, may not rise to the threshold level and when processed are not identified as image areas but rather are classified erroneously as non-image or background areas.

Figure 2:
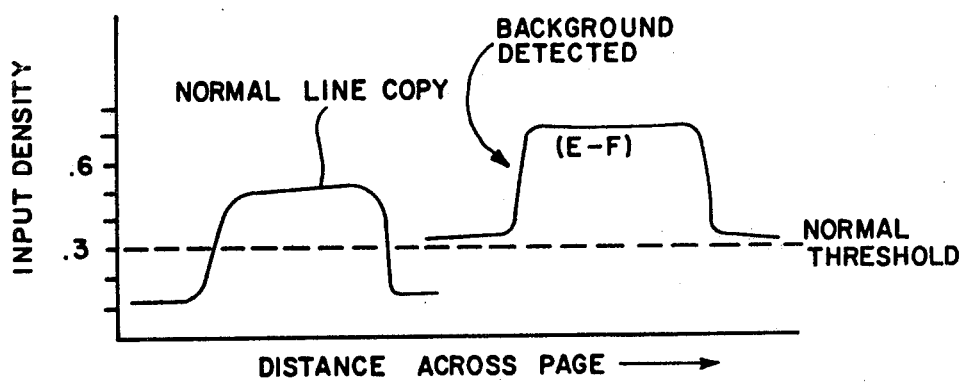
FIG. 2 is a graph plot illustrating typical image background densities.

In FIG. 2, a plot of typical image background densities is shown. There it can be seen that an area E-F of relatively high background density may be erroneously identified as an image area because of the background density is above the threshold level in use.

The present invention seeks to accommodate for this inherent inability in threshold systems, and screening systems as well, to detect or compensate for marginal image and background areas. The present invention as will appear provides a threshold level which adapts or changes in accommodatiofn of variations in image and-/or background artifacts.

Figure 3:
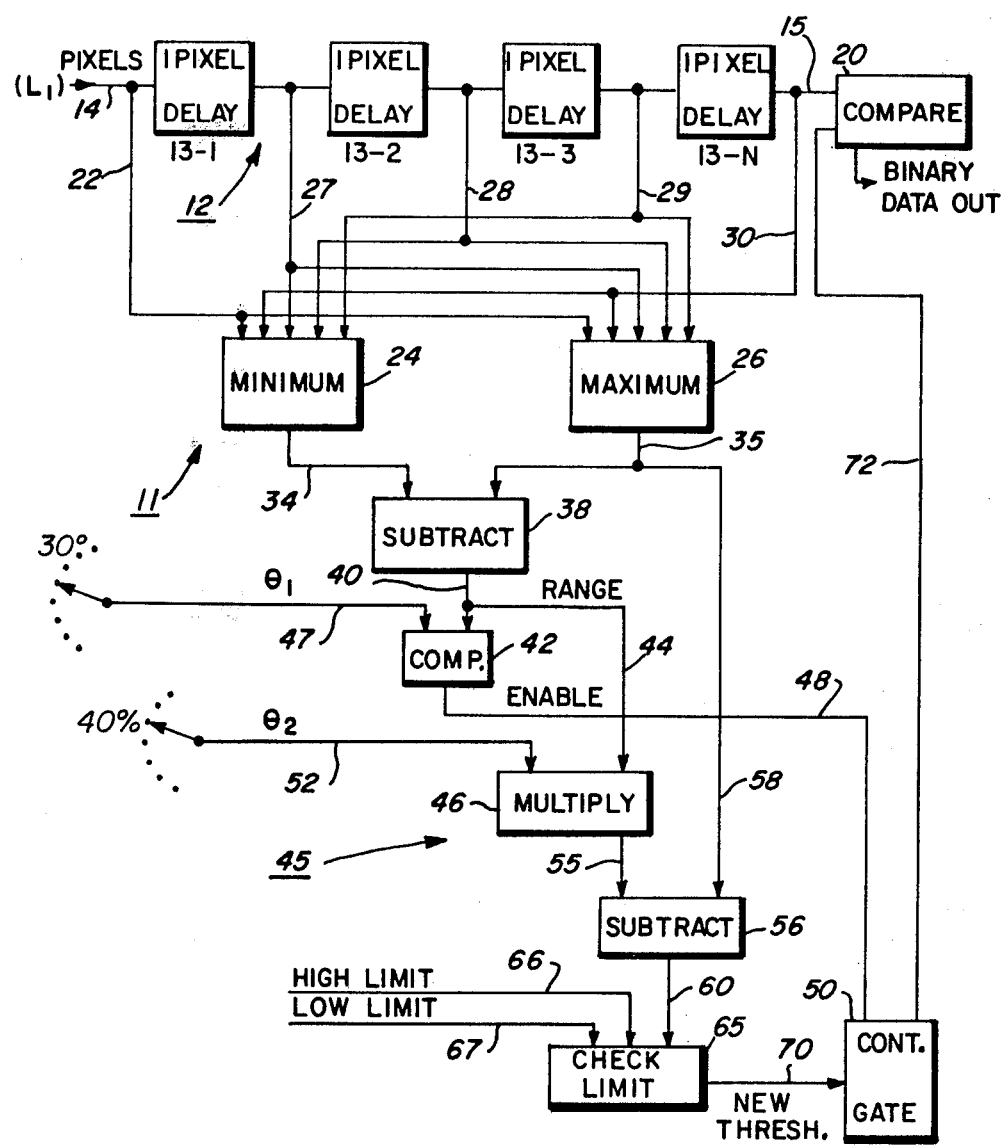
FIG. 3 is a circuit schematic showing details of the adaptive thresholder of the present invention.

Referring to FIGS. 3 and 4, the adaptive thresholder 11 of the present invention is thereshown. Thresholder 11 includes a buffer array 12 comprised of a plurality of one pixel delay buffers 13-1, 13-2, 13-3, 13-n, for imposing a succession of one pixel delays on the stream of image pixels input thereto through line 14 from a suitable source (not shown). Output line 15 couples the output of the last buffer 13-n in the buffer array 12 to one input of a comparator or thresholding circuit 20. Pixel input line 14 is tapped by line 22 which is in turn coupled to one input terminal of minimum and maximum pixel level detection circuits 24, 26, respectively. Lines 27, 28, 29, 30 couple the output side of the several one pixel delay buffers 13-1, 13-2, 13-3, 13-n comprising buffer array 12 to the input terminals of minimum and maximum pixel detection circuits 24, 26.

Minimum and maximum pixel level detection circuits 24, 26 comprise any suitable circuitry capable of identifying the minimum and maximum pixels in the block of pixels across delay buffer 12. Circuits 24, 26 for example may comprise a series of comparator circuits arranged to compare the various signal inputs thereto for the purpose of identifying the smallest (i.e. the minimum) and largest (i.e. the maximum) pixels.

Lines 34, 35 couple the output terminals of minimum and maximum pixel level detector circuits to differencing circuit herein a subtractor 38. Subtractor 38, which comprises any suitable circuit for subtracting or differencing two signal inputs, outputs a difference signal (RANGE) via line 40 to event detection or comparator circuit 42 and via line 44 to multiplier circuit 46. Comparator circuit 42, which controls enabling of new threshold control gate 50, compares the difference signal output by subtractor 38 with a preset value $\theta 1$, representing a minimum slope or rate of change in image background level, input through line 47. One suitable value for $\theta 1$ is 30°. The control signal output of comparator 42, which controls enabling of new threshold control gate 50, is fed to the enabling input of gate 50 through line 48.

A threshold determining circuit 45 includes a multiplier 46, which comprises any suitable multiplier circuit, to multiply the difference signal output of subtractor 38 by a preset weighting factor input through line 52. Weighting factor $\eta 2$ is a value, which may be experimentally determined, representing the amount of change in threshold level for a given event. A preferred value of $\theta 2$ is 40%. The output of multiplier 46 is coupled by line 55 to one input of subtractor 56. A second input of subtractor 56 is coupled by line 58 to the output of maximum pixel level detection circuit 26. Subtractor 56 subtracts or differences the maximum pixel level output of circuit 26 from the maximum background signal output of multiplier 46 to provide a new threshold.

The new threshold output by subtractor 56 is fed through line 60 to threshold level limiting circuit 65. Preset high and low threshold level limiting voltages are input to circuit 65 through lines 66, 67 respectively. Threshold level limiting circuit 65, which comprises any suitable comparator circuit, serves to compare the new threshold output by subtractor 56 with the preset high and low threshold level limits. Where the new threshold is greater than or less than one of the preset high and low threshold level limits, the new threshold is reduced or raised as appropriate to the preset high or low threshold level limits.

The signal output of threshold level limiting circuit 65 is fed through line 70 to the input of threshold control gate 50. The output of gate 50 is coupled to a second input terminal of threshold circuit 20 through line 72.

OPERATION

Lines of image pixels are clocked pixel by pixel through buffer array 12 by suitable pixel clock signals, it being understood that with each clock pulse, the pixels advance one step from one pixel delay buffer to the next. At each pixel step, the instantaneous pixel levels in buffer 12 are jointly input to minimum and maximum pixel detector circuits 24, 26 respectively, where the current minimum and maximum pixels are identified. The minimum and maximum pixels identified by circuits 24, 26 are input to subtractor 38 where the pixels are differenced to provide a difference (i.e. RANGE) signal. The difference signal output by subtractor 38 is fed to event comparator 42 to determine if the new threshold (which is calculated in any event) will be used, and to multiplier 46 of threshold determining circuit 45 where the new threshold is calculated.

To determine if the new threshold is to be used, comparator 42 compares the difference signal with a predetermined constant, $\theta 1$ representing a minimum change in background density. Where the difference signal is above the constant, indicating that the rate of change in the background image is greater than the predetermined minimum represented by the constant $\theta 1$, a signal from comparator 42 enables threshold control gate 50 to apply the new threshold output by threshold determining circuit 45 to thresholding circuit 20. Where the rate of change in image background is less than the predetermined minimum, control gate 50 is not enabled and application of the new threshold to thresholding circuit 20 is precluded.

Concurrently, a new threshold is determined based upon the content of delay buffer 12 by threshold determining circuit 45. For this purpose, the difference signal (RANGE) output by subtractor 38 is fed to multiplier circuit 46 of circuit 45 where the difference signal is multiplied by the weighting factor $\theta 2$ representing the amount of change in threshold for a given event. The threshold signal output by multiplier 46 is fed to subtractor 56 where the threshold signal is subtracted from the maximum pixel signal output by maximum pixel detector circuit 26 to provide a new threshold. The new threshold output by subtractor 56 is compared with preset maximum and minimum threshold limits and reduced or increased as required to bring the new threshold to a level no greater than or less than the preset threshold limits by comparator circuit 65. The new threshold is output to threshold control gate 50 for application to thresholding circuit 20 should control gate 50 be enabled as described heretofore.

While a single line (L1) of pixels is illustrated as being processed herein, multiple lines (L2, . . . LN) may be processed. In that event additional buffer arrays would be provided with one of each additional buffer array being associated with each additional pixel line.

While the invention has been described with reference to the structure disclosed, it is not confined to the details set forth, but is intended to cover such modifications or changes as may come within the scope of the following claims.

We claim:

1. The method of determining the optimum threshold for thresholding image pixels, comprising the steps of:
   (a) buffering a block if image pixels in a stream of image pixels, at least one of the pixels in said block of pixels comprising the pixel to be thresholded;
   (b) identifying maximum and minimum pixels in said block of pixels;
   (c) differencing said maximum and minimum pixels from one another to provide a difference signal;
   (d) multiplying said difference signal by a predetermined constant representing a desired change in threshold level to provide a base threshold; and
   (e) differencing said base threshold from said maximum pixel to provide said optimum threshold.

2. The method according to claim 1 including the steps of:
   (a) establishing preset maximum and minimum threshold levels; and
   (b) limiting said optimum threshold to a level no greater than or less than said preset maximum and minimum threshold levels.

3. The method according to claim 1 or 2 including the steps of:
   (a) comparing said difference signal with a second predetermined constant representing the minimum acceptable rate of change in image background density to provide a reference signal; and
   (b) updating the existing threshold with said optimum threshold in response to a predetermined difference between said difference signal and said reference signal to provide a new threshold for thresholding said one pixel and subsequent pixels.

4. The method according to claim 1 including the step of buffering at least two lines of image pixels.

5. Apparatus for adaptively thresholding image pixels, comprising, in combination:
   (a) buffer means for storing a plurality of successive ones of said pixels including the pixel to be thresholded;
   (b) means for identifying the maximum pixel in said plurality of pixels;
   (c) means for identifying the minimum pixel in said plurality of pixels;
   (d) first subtractor means for subtracting the output of said maximum pixel identifying means from said minimum pixel identifying means;
   (e) multiplier means for multiplying the output of said first subtractor means by a predetermined constant representing a desired change in threshold level; and
   (f) second subtractor means for subtracting the output of said multiplier means from said maximum pixel identifying means to provide a threshold for use in thresholding said one pixel.

* * * * *